United States Patent
Kim et al.

(10) Patent No.: US 10,205,360 B2
(45) Date of Patent: Feb. 12, 2019

(54) ROTOR ASSEMBLY AND MOTOR INCLUDING THE SAME

(71) Applicant: LG Innotek Co., Ltd., Seoul (KR)

(72) Inventors: Byeong Yong Kim, Seoul (KR); Yong Chul Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 441 days.

(21) Appl. No.: 15/164,384

(22) Filed: May 25, 2016

(65) Prior Publication Data

US 2016/0352166 A1   Dec. 1, 2016

(30) Foreign Application Priority Data

May 27, 2015   (KR) .................... 10-2015-0074105

(51) Int. Cl.
*H02K 21/12* (2006.01)
*H02K 1/27* (2006.01)

(52) U.S. Cl.
CPC ......... *H02K 1/276* (2013.01); *H02K 2213/03* (2013.01)

(58) Field of Classification Search
CPC .......................... H02K 1/276; H02K 2213/03

USPC .................................................. 310/156.21
See application file for complete search history.

(56) References Cited

U.S. PATENT DOCUMENTS

| | | | | |
|---|---|---|---|---|
| 6,353,275 B1* | 3/2002 | Nishiyama | ........... | H02K 1/2706 310/156.21 |
| 2006/0186752 A1* | 8/2006 | Matsumoto | ........... | H02K 1/276 310/156.53 |
| 2007/0205686 A1* | 9/2007 | Ishida | ........... | H02K 1/276 310/156.21 |
| 2009/0200885 A1* | 8/2009 | Kikuchi | ........... | B22F 1/02 310/156.78 |
| 2015/0130318 A1* | 5/2015 | Kitada | ........... | C08L 63/00 310/156.21 |

* cited by examiner

*Primary Examiner* — Thanh Lam
(74) *Attorney, Agent, or Firm* — Saliwanchik, Lloyd & Eisenschenk

(57) ABSTRACT

The present invention relates to a motor for a vehicle and a rotor applied to the motor, and the rotor may include a rotor housing including a magnet mounting portion; a magnet inserted in the magnet mounting portion; and a ferromagnetic bonding layer which fills between the magnet mounting portion and the magnet.

7 Claims, 4 Drawing Sheets

FIG. 3

| CLASSIFICATION | Ke | INCREASE OR DECREASE RATIO |
|---|---|---|
| | [Vs/rad] | |
| ADHESIVE (only) | 0.04935 | 100.0% |
| EMBODIMENT (FILLED WITH ADHESIVE AND FERROMAGNET) | 0.05073 | 102.8% |

ROTOR ASSEMBLY AND MOTOR INCLUDING THE SAME

CROSS-REFERENCE TO RELATED APPLICATION

This application claims the benefit under 35 U.S.C. § 119 of Korean Patent Application No. 10-2015-0074105, filed May 27, 2015, which is hereby incorporated by reference in its entirety.

TECHNICAL FIELD

Embodiment of the present invention relates to a motor for a vehicle and a rotor applied to the same.

BACKGROUND ART

As motors for vehicles gradually evolve into ones with high torque and high speed specifications, a robust design for a rotor assembly structure applied to a motor is becoming essential.

Generally, a structure of a rotor applied to an interior permanent magnet (IPM) motor is formed by forming a stacked rotor core which is formed by stacking a plurality of rotor core members in a disk shape and inserting a magnet in the rotor core.

Here, the magnet inserted in the rotor core is fixedly adhered to the magnet insertion hole using an adhesive and the like. However, in such a fixing method, when a motor is used for a long time or is used for a long time at a high temperature, since adhesive strength of the adhesive which fixes the magnet becomes weak, there are problems of the magnet moving from an original mounting position, foreign material being generated due to separation of the adhesive, and a magnet that cannot be fixed due to a glass transition phenomenon at a high temperature.

Particularly, for adhesive fixing of the magnet, a region which is not filled with the adhesive occurs in the magnet insertion hole, and such a region leads to magnetic loss.

Technical Problem

The present invention is directed to providing a structure of rotor assembly capable of revolutionarily reducing magnetic loss generated in a bonding method using an adhesive by disposing a ferromagnetic bonding layer including an adhesive material having a ferromagnetic powder between a magnet inserted in a magnet insertion hole and the magnet insertion hole.

Technical Solution

One aspect of the present invention provides rotor assembly including: a rotor core including a magnet mounting portion; a magnet inserted in the magnet mounting portion; and a ferromagnetic bonding layer which fills between the magnet mounting portion and the magnet.

Particularly, the structure of the rotor assembly is implemented as a motor including: a motor housing; stator assembly disposed in the motor housing; rotor assembly having the above-described structure and disposed inside the stator assembly; and a shaft which passes through the center of the rotor assembly.

Advantageous Effects

According to the embodiment of the present invention, there is an effect of revolutionarily reducing magnetic loss generated in a bonding method using an adhesive by disposing a ferromagnetic bonding layer including an adhesive material having a ferromagnetic powder between a magnet inserted in a magnet insertion hole and the magnet insertion hole.

BRIEF DESCRIPTION OF THE DRAWINGS

FIG. 3 is a table illustrating an output characteristic of the rotor assembly according to the embodiment of the present invention.

REFERENCE NUMERALS

Figure 1:
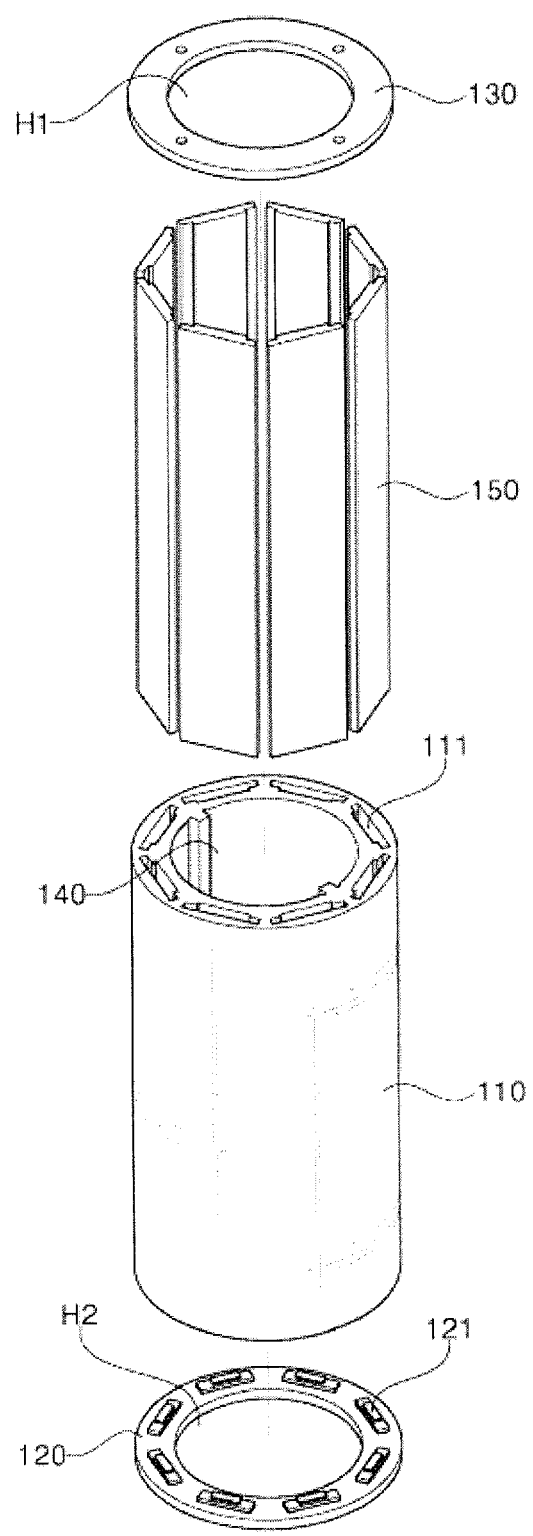
FIGS. 1 and 2 are conceptual views for describing a structure of rotor assembly according to an embodiment of the present invention.

100: Rotor Assembly
110: Rotor Core
111: Magnet Insertion Hole
120: First Fixing Plate
121: Press-Fitting Pattern for Fixing Magnet
130: Second Fixing Plate
140: Shaft Coupling Groove
150: Magnet
200: Shaft

MODES OF INVENTION

Hereinafter, a structure and an operation according to the present invention will be specifically described. In the description with reference to accompanying drawings, the same components are assigned with the same reference numerals regardless of drawing numerals and repetitive descriptions thereof will be omitted. While such terms as "first," "second," etc., may be used to describe various components, such components must not be limited to the above terms. The above terms are used only to distinguish one component from another.

Figure 2:
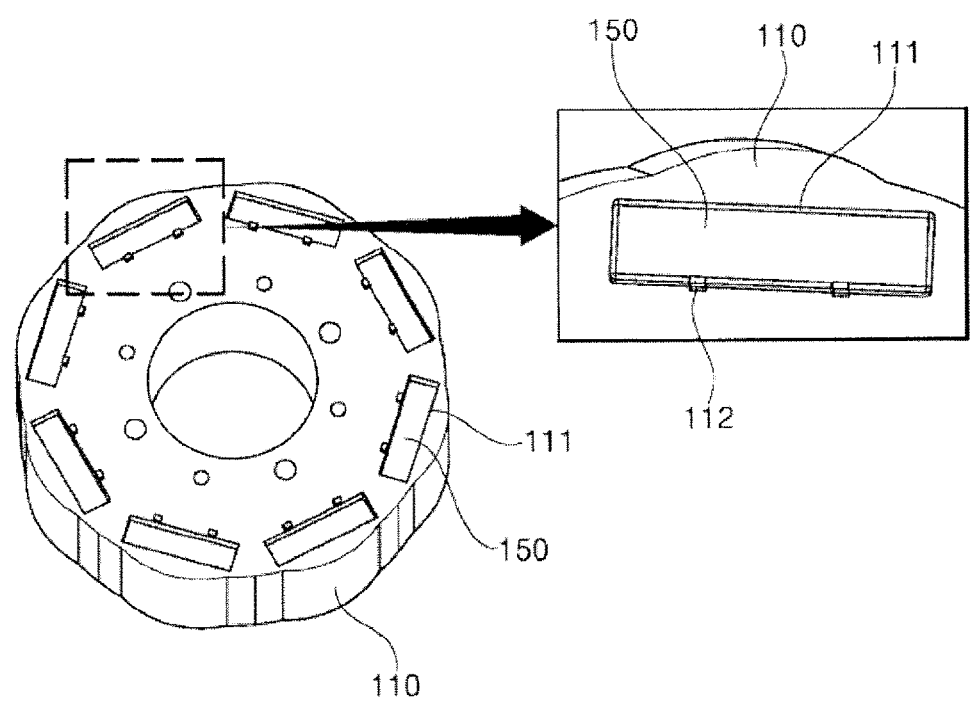

FIG. 1 is a conceptual view for describing a structure of rotor assembly according to an embodiment of the present invention, FIG. 2 is an exploded conceptual view illustrating a main portion of the rotor shown in FIG. 1, and FIG. 3 is a table illustrating a result of applying a ferromagnetic bonding layer according to the embodiment of the present invention.

Referring to FIGS. 1 and 2, a rotor 100 according to the embodiment of the present invention includes a rotor core 110 in which a plurality of rotor core members are stacked and a plurality of magnets 150 inserted into magnet insertion holes 111 of the rotor core 110. In this case, a reinforcement structure for preventing a separation of the magnets may be additionally provided at the perimeter of the magnet insertion hole 111 at an uppermost portion of the rotor core by providing supports 112 having a structure protruding to the magnet insertion hole by press-fitting of the rotor core member of an upper most layer.

Particularly, a ferromagnetic bonding layer fills between the magnet insertion hole 111 and the magnet 150 and is cured to couple the magnet insertion hole 111 and the magnet 150. The ferromagnetic bonding layer refers to a material in which a ferromagnetic powder is mixed with various adhesive resins applied when a conventional magnet is inserted in a rotor. Here, the ferromagnetic powder includes a powder of a metal such as iron (Fe), cobalt (Co), or nickel (Ni) or is defined as a material which includes a glass forming element having iron containing boron and cobalt and a semi-metallic element having silicon and has a characteristic of a relative permeability $\mu r \gg 1$.

Here, a mixture in which the adhesive resin and the ferromagnetic metal powder are mixed at the composition ratio in the range of 2:(1 to 1.5) may be used for the ferromagnetic bonding layer. Although a mixture of the ferromagnetic metal powder of which a composition ratio is above the range of the ratio may have an excellent effect of preventing magnetic loss, there may be problems of magnet separation and the like due to reduction of an adhesive property and it is difficult to expect an improvement in preventing magnetic loss from a mixture of the ferromagnetic power of which ratio is less than the range of the ratio.

FIG. 3 is a table in which a comparison is made between values of counter electromotive forces Ke of rotors when a magnet is fixedly inserted with 100% adhesive resin and when a magnet is fixedly inserted with a mixture of which a composition ratio of an adhesive resin to a ferromagnetic body is 2:1 in the structure shown in FIGS. 1 and 2. Here, the counter electromotive force was increased by about 2.8% in the embodiment. This shows that an output of a motor can be increased by preventing magnet loss without reducing bonding strength.

Figure 4:
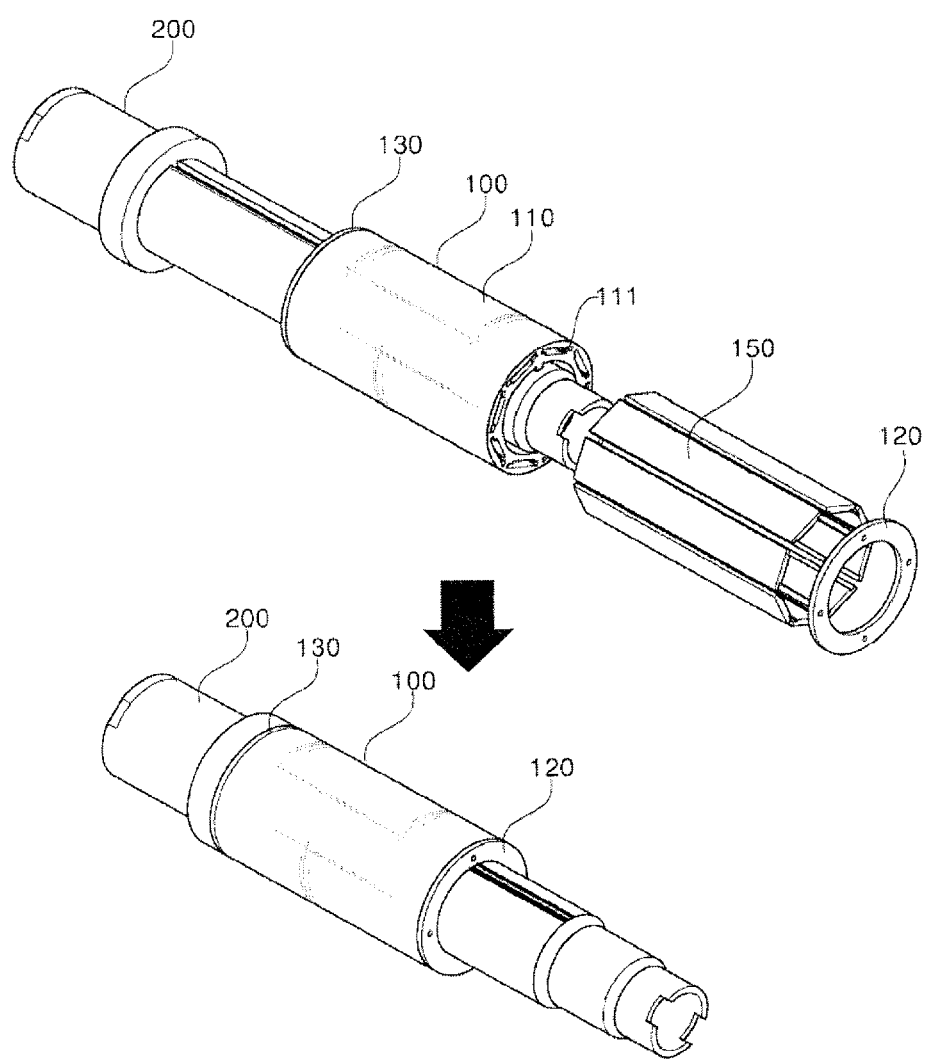
FIG. 4 is a view illustrating a process of the rotor assembly according to the above-described embodiment of the present invention illustrated in FIGS. 1 to 3 being coupled and assembled with a shaft.

FIG. 4 is a view illustrating a process of the rotor according to the above-described embodiment of the present invention illustrated in FIGS. 1 to 3 being coupled and assembled with a shaft.

As illustrated in FIG. 4, a shaft 200 which passes through the center of the rotor assembly 100 according to the embodiment of the present invention illustrated in FIG. 1 is coupled to the rotor 100, fixing plates 120 and 130 are disposed on top and bottom surfaces of the above-described rotor assembly 100, and particularly, by bonding the magnet insertion hole and the magnet in a structure of the rotor using the ferromagnetic bonding layer, the magnet may be stably fixed, magnetic loss is prevented at the same time, and thus, an output can be improved. Such rotor assembly may enable realizing various motors by additionally coupling a motor housing, a stator assembly, and the like to a structure.

In the detailed description of the present invention as described above, a specific embodiment has been described. However, various changes may be made without departing from the scope of the present invention. The scope of the present invention is defined not by the described embodiment but by the appended claims, and encompasses equivalents that fall within the scope of the appended claims.

What is claimed is:

1. A rotor assembly comprising:
   a rotor core including a magnet mounting portion;
   a magnet inserted in the magnet mounting portion; and
   a ferromagnetic bonding layer which fills between the magnet mounting portion and the magnet.

2. The rotor assembly of claim 1, wherein the ferromagnetic bonding layer includes an adhesive resin including a ferromagnetic powder.

3. The rotor assembly of claim 2, wherein a composition ratio of the adhesive resin to the ferromagnetic powder is 2:(1 to 1.5).

4. The rotor assembly of claim 3, wherein the ferromagnetic powder includes any one of iron (Fe), cobalt (Co), and nickel (Ni).

5. The rotor assembly of claim 4, wherein the rotor core having supports having a structure protruding to the magnet insertion hole at the perimeter of the magnet insertion hole at an uppermost portion of the rotor core.

6. An electric power steering (EPS) motor comprising:
   a motor core;
   a stator assembly disposed in the motor housing;
   a rotor assembly disposed inside the stator assembly; and
   a shaft which passes through the center of the rotor assembly,
   wherein the rotor assembly includes:
   a rotor housing including a magnet mounting portion;
   a magnet inserted in the magnet mounting portion; and
   a ferromagnetic bonding layer which fills between the magnet mounting portion and the magnet.

7. The electric power steering (EPS) motor of claim 6, wherein rotor assembly having fixing plates are disposed on top and bottom surfaces of the rotor assembly.

* * * * *